(12) United States Patent
Yang et al.

(10) Patent No.: US 9,113,457 B2
(45) Date of Patent: Aug. 18, 2015

(54) METHOD AND APPARATUS FOR TRANSMITTING CONTROL INFORMATION

(75) Inventors: Suckchel Yang, Anyang (KR); Mingyu Kim, Anyang (KR); Joonkui Ahn, Anyang (KR); Dongyoun Seo, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 13/876,043

(22) PCT Filed: Oct. 4, 2011

(86) PCT No.: PCT/KR2011/007303
§ 371 (c)(1),
(2), (4) Date: Mar. 26, 2013

(87) PCT Pub. No.: WO2012/044135
PCT Pub. Date: Apr. 5, 2012

(65) Prior Publication Data
US 2013/0188592 A1 Jul. 25, 2013

Related U.S. Application Data

(60) Provisional application No. 61/388,619, filed on Oct. 1, 2010.

(51) Int. Cl.
*H04W 72/04* (2009.01)
*H04L 5/00* (2006.01)
*H04L 27/26* (2006.01)
*H04W 40/00* (2009.01)

(52) U.S. Cl.
CPC ............ *H04W 72/0413* (2013.01); *H04L 5/00* (2013.01); *H04L 5/0035* (2013.01); *H04L 5/0053* (2013.01); *H04L 5/0055* (2013.01); *H04L 5/0057* (2013.01); *H04L 5/0073* (2013.01);

(Continued)

(58) Field of Classification Search
CPC ..... H04L 5/0053; H04L 1/1861; H04L 5/0055
USPC .................................................. 370/329, 252
See application file for complete search history.

(56) References Cited

U.S. PATENT DOCUMENTS

2009/0257394 A1  10/2009  Chun et al.
2010/0091708 A1   4/2010  Nishikawa et al.
(Continued)

FOREIGN PATENT DOCUMENTS

KR     1020100073992     7/2010
WO        2010018970     2/2010

OTHER PUBLICATIONS

PCT International Application No. PCT/KR2011/007303, Written Opinion of the International Searching Authority dated Apr. 27, 2012, 18 pages.

(Continued)

*Primary Examiner* — Charles C Jiang
*Assistant Examiner* — Will Lin
(74) *Attorney, Agent, or Firm* — Lee, Hong, Degerman, Kang & Waimey

(57) ABSTRACT

The present invention relates to a wireless communication system. More specifically, the present invention relates to a method and an apparatus for transmitting uplink control information when a plurality of cells are configured, comprising the following steps: receiving PDCCH; generating reception reply information on PDSCH which corresponds to the PDCCH; and transmitting the reception reply information through PUCCH.

12 Claims, 13 Drawing Sheets

(52) U.S. Cl.
CPC ........... *H04L 27/2628* (2013.01); *H04L 5/0007* (2013.01)

(56) References Cited

U.S. PATENT DOCUMENTS

2010/0177694 A1* 7/2010 Yang et al. .................... 370/328
2011/0045860 A1* 2/2011 Nam et al. .................... 455/509
2011/0243066 A1* 10/2011 Nayeb Nazar et al. ....... 370/328

OTHER PUBLICATIONS

PCT International Application No. PCT/KR2011/007303, Written Opinion of the International Searching Authority dated Apr. 27, 2012, 10 pages.

* cited by examiner

METHOD AND APPARATUS FOR TRANSMITTING CONTROL INFORMATION

CROSS-REFERENCE TO RELATED APPLICATIONS

This application is the National Stage filing under 35 U.S.C. 371 of International Application No. PCT/KR2011/007303, filed on Oct. 4, 2011, which claims the benefit of U.S. Provisional Application Ser. No. 61/388,619, filed on Oct. 1, 2010, the contents of which are all hereby incorporated by reference herein in their entirety.

FIELD OF THE INVENTION

The present invention relates to a wireless communication system, and more particularly to a method and apparatus for transmitting control information.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DETAILED DESCRIPTION OF THE INVENTION

Technical Problem

An object of the present invention devised to solve the problem lies in a method and apparatus for efficiently transmitting control information in a wireless communication system. Another object of the present invention devised to solve the problem lies in a method and apparatus for efficiently transmitting uplink control information in a situation of the consisting of a plurality of cells, and efficiently managing resources associated with the uplink control information. It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method of transmitting uplink control information at a communication apparatus in a consisting of a plurality of cells including a primary cell (PCell) and a secondary cell (SCell) in a wireless communication system, the method comprising: receiving a Physical Downlink Control Channel (PDCCH) signal; generating received response information of a Physical Downlink Shared Channel (PDSCH) signal corresponding to the PDCCH signal; and transmitting the received response information using a Physical Uplink Control Channel (PUCCH) resource linked to one specific Control Channel Element (CCE) from among one or more CCEs constructing the PDCCH, when the PDCCH signal is received in the SCell, the PUCCH resource is determined using an index value shown in the following equation:

$$\text{Modulo } (f(n_{SCC-CCE}), M) \qquad [\text{Equation}]$$

where $n_{SCC-CCE}$ is an index of the specific CCE, M is a value related to the number of CCEs of the PCell, f(x) is a function in which x is used as a factor, and modulo(x,y) is a remainder obtained when 'x' is divided by 'y'.

In another aspect of the present invention, a communication apparatus configured to transmit uplink control information in a wireless communication system including a plurality of cells including a primary cell (PCell) and a secondary cell (SCell) includes: a Radio Frequency (RF) unit; and a processor, wherein the processor is configured to receive a Physical Downlink Control Channel (PDCCH) signal, to generate received response information of a Physical Downlink Shared Channel (PDSCH) signal corresponding to the PDCCH signal, and to transmit the received response information using a Physical Uplink Control Channel (PUCCH) resource linked to one specific Control Channel Element (CCE) from among one or more CCEs constructing the PDCCH, when the PDCCH signal is received in the SCell, the PUCCH resource is determined using an index value shown in the following equation:

$$\text{Modulo } (f(n_{SCC-CCE}), M) \qquad [\text{Equation}]$$

where $n_{SCC-CCE}$ is an index of the specific CCE, M is a value related to the number of CCEs of the PCell, f(x) is a function in which x is used as a factor, and modulo(x,y) is a remainder obtained when 'x' is divided by 'y'.

$f(n_{SCC-CCE})$ may be defined as $A*n_{SCC-CCE}+B$, where A is a constant or a function, and B is a constant or a function.

A may be set to 1 (A=1), and B may be set to 0 (B=0).

B may include $abs(N_{SCC-CCE}-M)$, where abs(x) is an absolute value of the value (x), and $N_{SCC-CCE}$ is the number of SCell CCEs in a subframe in which the PDCCH is received.

$f(n_{SCC-CCE})$ may be defined as $n_{SCC-CCE}+O_{SCC-CCE}$, where $O_{SCC-CCE}$ is a CCE index offset.

M may be the number of PCell CCEs available in a subframe in which the PDCCH is received, or may indicate a maximum number of CCEs defined in the PCell.

If the PDCCH signal is received in the PCell, an index for the PUCCH resource may be determined by the following equation:

$$n^{(1)}_{PUCCH}=n_{CCE}+N^{(1)}_{PUCCH} \qquad [\text{Equation}]$$

where $n^{(1)}_{PUCCH}$ is a PUCCH resource index, $n_{CCE}$ is an index of the smallest CCE from among one or more CCEs constructing the PDCCH, and $N^{(1)}_{PUCCH}$ is a value signaled by a higher layer.

Effects of the Invention

As is apparent from the above description, exemplary embodiments of the present invention can efficiently transmit control information in a wireless communication system, efficiently transmitting uplink control information in a situation in the consisting of a plurality of cells, and efficiently managing resources associated with the uplink control information.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

In a wireless communication system, a user equipment (UE) may receive information from a base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
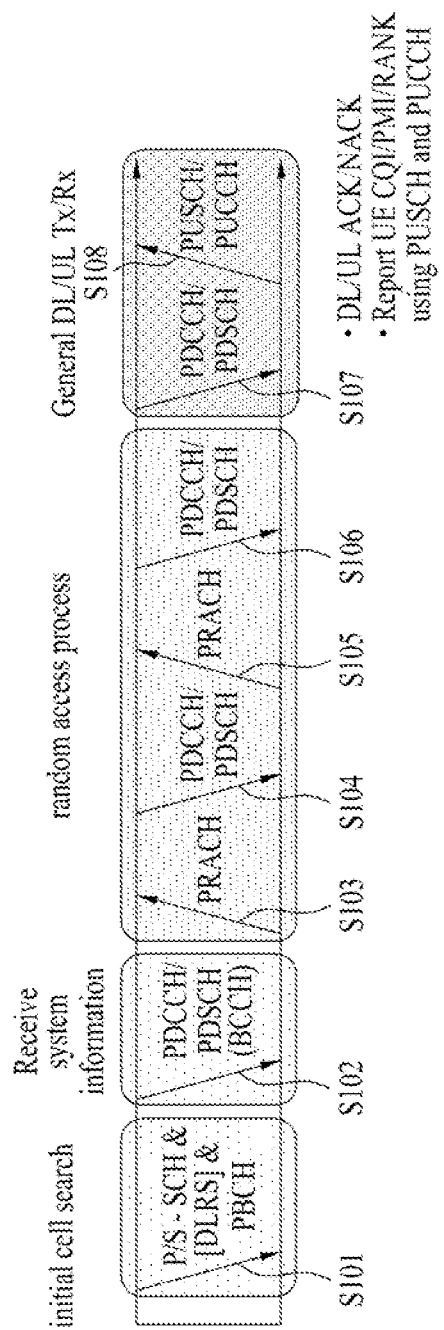
FIG. 1 is a conceptual diagram illustrating physical channels used in a 3GPP LTE system acting as an exemplary mobile communication system and a general method for transmitting a signal using the physical channels.

FIG. 1 is a conceptual diagram illustrating physical channels for use in a 3GPP LTE system and a general method for transmitting a signal using the physical channels.

Referring to FIG. 1, when powered on from powered off or when entering a new cell, a UE performs initial cell search in step S101. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire broadcast information in the cell by receiving a Physical Broadcast CHannel (PBCH) from the BS. During the initial cell search, the UE may monitor a downlink channel status by receiving a Downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S102.

Thereafter, if the UE accesses the BS, it may perform random access to the BS in steps S103 to S106. For random access, the UE may transmit a preamble to the BS on a Physical Random Access CHannel (PRACH) in step S103 and receive a response message for the random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI). In the specification, the HARQ ACK/NACK is simply referred to as a HARQ-ACK or ACK/NACK (A/N). The HARQ-ACK includes at least one of a positive ACK (simply, ACK), a negative ACK (NACK), DTX and NACK/DTX. The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
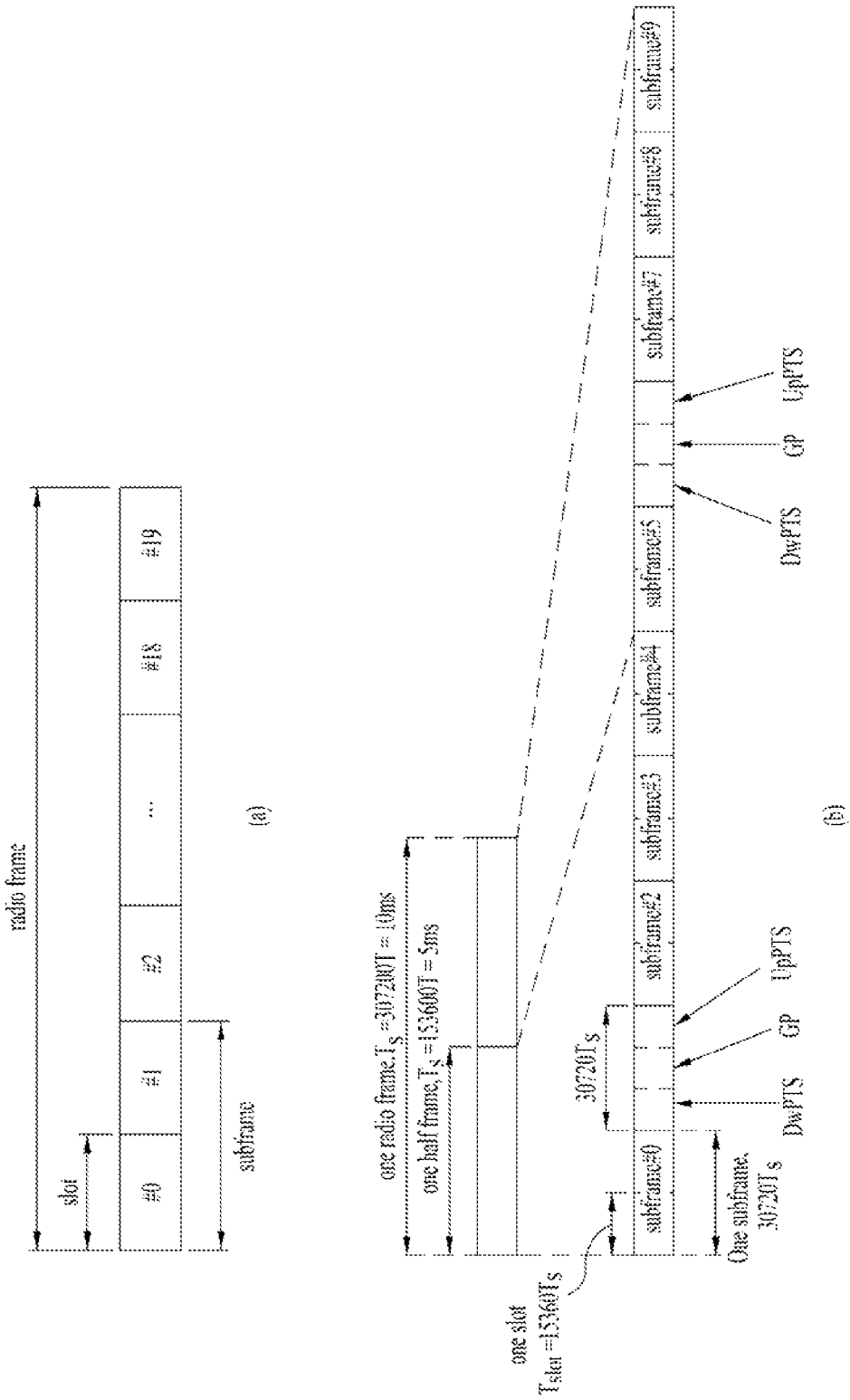
FIG. 2 is a diagram illustrating a structure of a radio frame.

FIG. 2 illustrates a radio frame structure. In a cellular OFDM wireless packet communication system, UL/DL data packet transmission is performed based on subframe. One subframe is defined as a predetermined interval including a plurality of OFDM symbols. 3GPP LTE supports a type-1 radio frame applicable to Frequency Division Duplex (FDD) and type-2 radio frame applicable to Time Division Duplex (TDD).

FIG. 2(a) illustrates a type-1 radio frame structure. A DL radio frame includes 10 subframes each having 2 slots in the time domain. A time required to transmit one subframe is referred to as Transmission Time Interval (TTI). For example, one subframe is 1 ms long and one slot is 0.5 ms long. One slot includes a plurality of OFDM symbols in the time domain and a plurality of Resource Blocks (RBs) in the frequency domain. Since 3GPP LTE systems use OFDMA in downlink, an OFDM symbol represents one symbol interval. The OFDM symbol can be called an SC-FDMA symbol or symbol interval. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

The aforementioned structure of the radio frame is only exemplary, and various modifications can be made to the number of subframes contained in the radio frame or the number of slots contained in each subframe, or the number of OFDM symbols in each slot.

Figure 3:
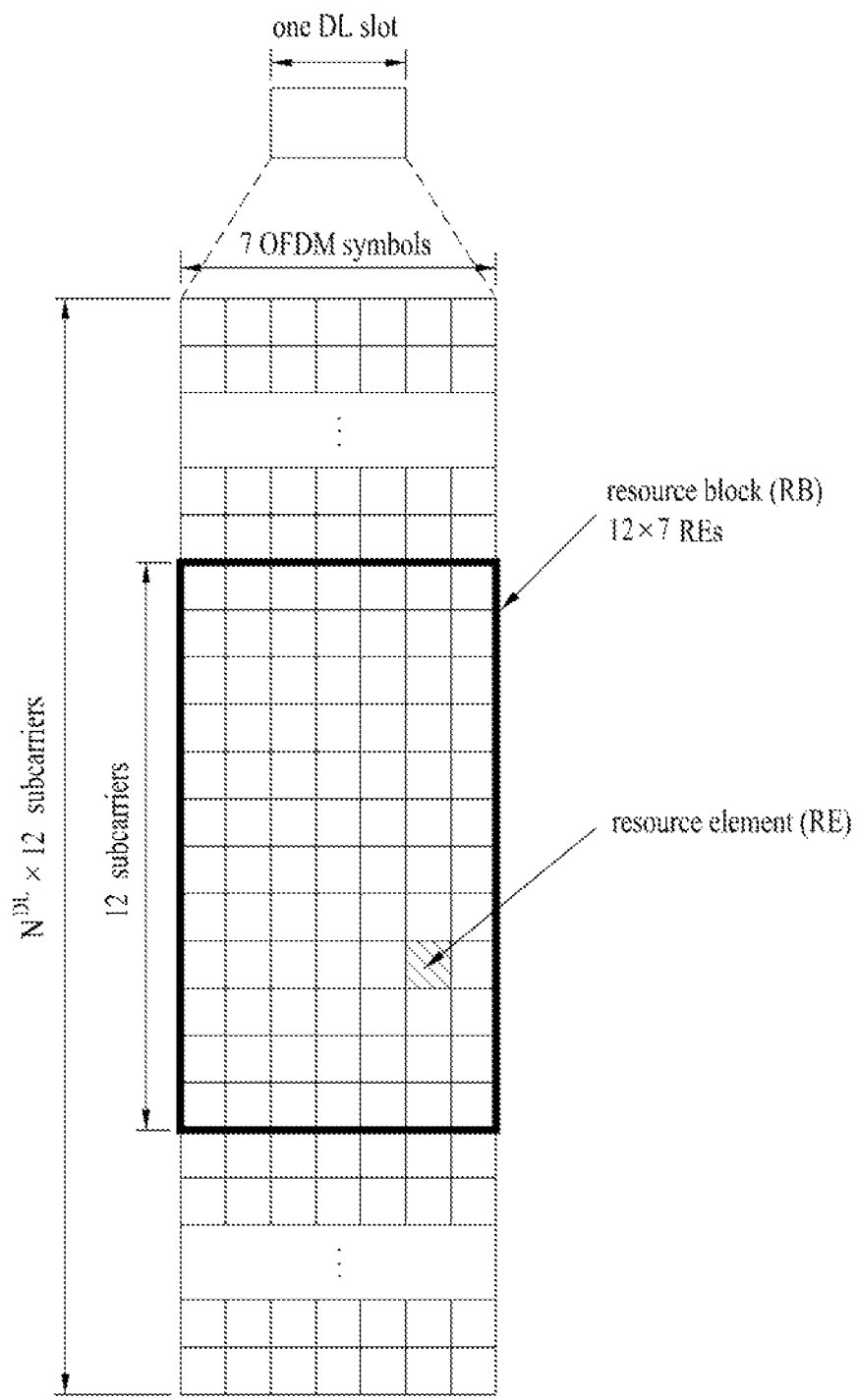
FIG. 3 exemplarily shows a resource grid of a downlink slot.

FIG. 3 exemplarily shows a resource grid of a downlink slot.

Referring to FIG. 3, a downlink slot includes a plurality of OFDM symbols in a time domain. One downlink slot includes 7 (or 6) OFDM symbols and a resource block (RB) includes 12 subcarriers in a frequency domain. Each element on a resource grid may be defined as a resource element (RE). One RB includes 12×7 (or 12×6) REs. The number ($N_{RB}$) of RBs contained in a downlink slot is dependent upon a downlink transmission bandwidth. An uplink slot structure is identical to the downlink slot structure, but OFDM symbols are replaced with SC-FDMA symbols in the uplink slot structure differently from the downlink slot structure.

Figure 4:
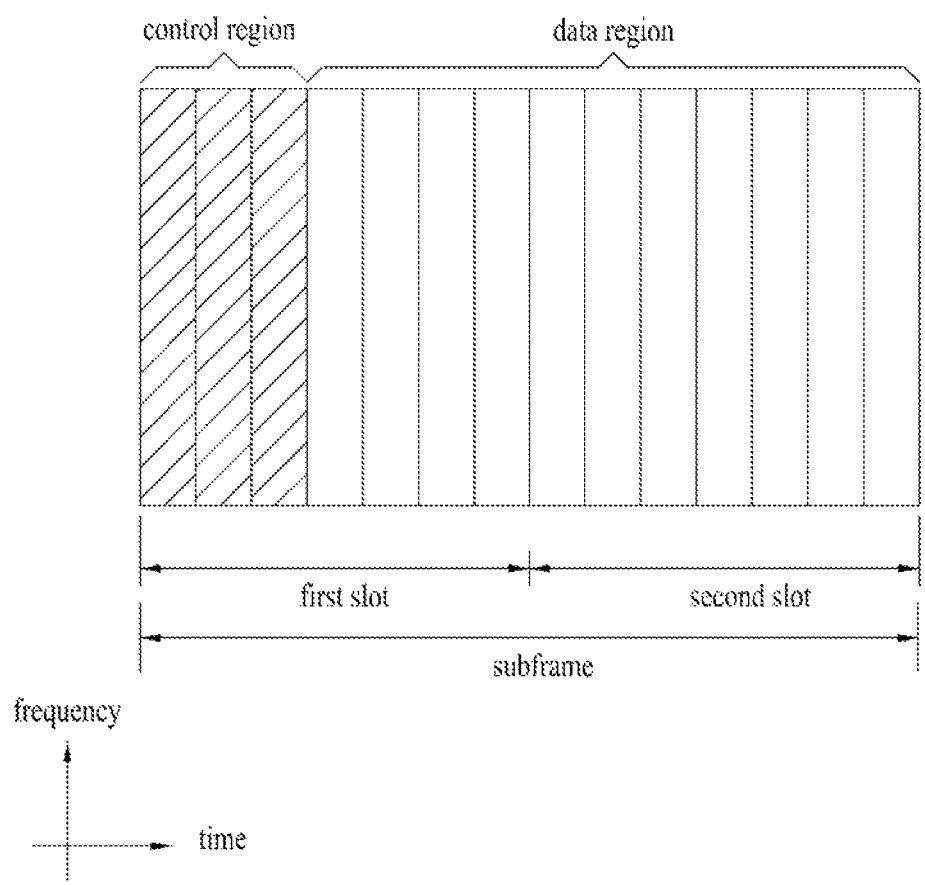
FIG. 4 illustrates a downlink frame structure.

FIG. 4 is a downlink subframe structure.

Referring to FIG. 4, a maximum of 3 (or 4) OFDM symbols located in the front part of a first slot of the subframe may correspond to a control region to which a control channel is allocated. The remaining OFDM symbols correspond to a data region to which a Physical Downlink Shared CHannel (PDSCH) is allocated. A variety of downlink control channels may be used in the LTE, for example, a Physical Control Format Indicator Channel (PCFICH), a Physical Downlink Control Channel (PDCCH), a Physical hybrid ARQ Indicator Channel (PHICH), etc. PCFICH is transmitted from a first OFDM symbol of the subframe, and carries information about the number of OFDM symbols used for transmitting a control channel within the subframe. PHICH carries a Hybrid Automatic Repeat request acknowledgment/negative-acknowledgment (HARQ ACK/NACK) signal as a response to an uplink transmission signal.

Control information transmitted through a PDCCH is referred to as downlink control information (DCI). The DCI includes resource allocation information for a UE or a UE group and other control information. For example, the DCI includes uplink/downlink scheduling information, an uplink transmit (Tx) power control command, etc.

PDCCH carries a variety of information, for example, transmission format and resource allocation information of a downlink shared channel (DL-SCH), transmission format and resource allocation information of an uplink shared channel (UL-SCH), paging information transmitted over a paging channel (PCH), system information transmitted over DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A user equipment (UE) can monitor a plurality of PDCCHs. PDCCH is transmitted as an aggregation of one or more contiguous control channel elements (CCEs). CCE is a logical allocation unit that is used to provide a coding rate based on a radio channel state to a PDCCH. CCE may correspond to a plurality of resource element groups (REGs). The format of PDCCH and the number of PDCCH bits may be determined according to the number of CCEs. A base station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, an identifier of the corresponding UE (e.g., cell-RNTI (C-RNTI)) may be masked with the CRC. If PDCCH is provided for a paging message, a paging identifier (e.g., paging-RNTI (P-RNTI)) may be masked with a CRC. If PDCCH is provided for system information (e.g., system information block (SIC)), system information RNTI (SI-RNTI) may be masked with CRC. If PDCCH is provided for a random access response, random access-RNTI (RA-RNTI) may be masked with CRC.

Figure 5:
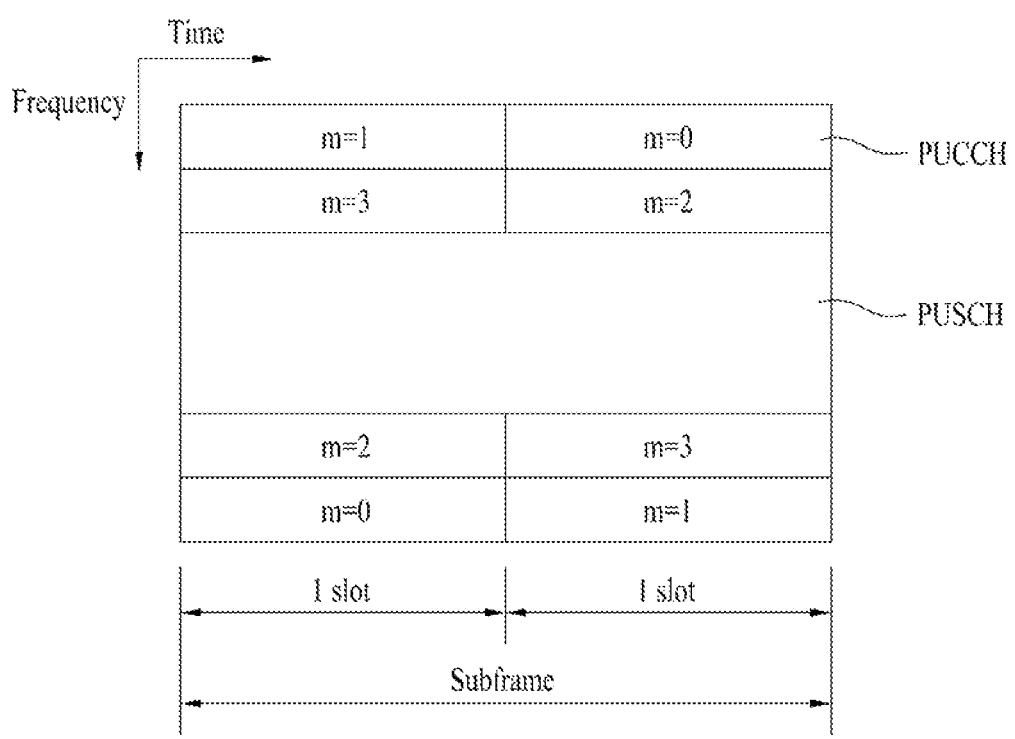
FIG. 5 illustrates an uplink subframe structure.

FIG. 5 is a diagram showing the structure of an uplink subframe used in LTE.

Referring to FIG. 5, the UL subframe includes a plurality of slots (e.g., 2 slots). Each slot may include different numbers of SC-FDMA symbols according to CP length. The UL subframe is divided into a data region and a control region in a frequency domain. The data region includes a PUSCH and transmits a data signal such as a voice signal or the like. The control region includes a PUCCH, and transmits Uplink Control Information (UCI). PUCCH includes a pair of RBs (hereinafter referred to as an RB pair) located at both ends of the data region on a frequency axis, and is hopped using a slot as a boundary.

PUCCH may be used to transmit the following control information, i.e., Scheduling Request (SR), HARQ ACK/NACK, and a Channel Quality Indicator (CQI), and a detailed description thereof will hereinafter be described.

Scheduling Request (SR): Scheduling request (SR) is used for requesting UL-SCH resources, and is transmitted using an On-Off Keying (OOK) scheme.

HARQ ACK/NACK: HARQ ACK/NACK is a response signal to an downlink (DL) data packet on a PDSCH. The HARQ ACK/NACK indicates whether or not a DL data packet has been successfully received. ACK/NACK of 1 bit is transmitted as a response to a single DL codeword, and ACK/NACK of 2 bits is transmitted as a response to two DL codewords.

Channel Quality Indicator (CQI): CQI is feedback information for a downlink channel. MIMO-associated feedback information includes a Rank Indicator (RI), a Precoding Matrix Indicator (PMI) and Precoding Type Indicator(PTI). 20 bits are used per subframe.

The amount of control information (i.e., UCI), that is capable of being transmitted in a subframe by the UE, is dependent upon the number of SC-FDMAs available for UCI transmission. SC-FDMAs available in UCI transmission indicate the remaining SC-FDMA symbols other than SC-FDMA symbols that are used for Reference Signal (RS) transmission in a subframe. In the case of a subframe in which a Sounding Reference Signal (SRS) is established, the last SC-FDMA symbol of the subframe is also excluded. The Reference Signal (RS) is used for coherent detection of a PUCCH. PUCCH supports 7 formats according to transmission information.

Table 1 shows the mapping relationship between PUCCH format and UCI for use in LTE.

TABLE 1

| PUCCH format | Uplink control information (UCI) |
| --- | --- |
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Figure 6:
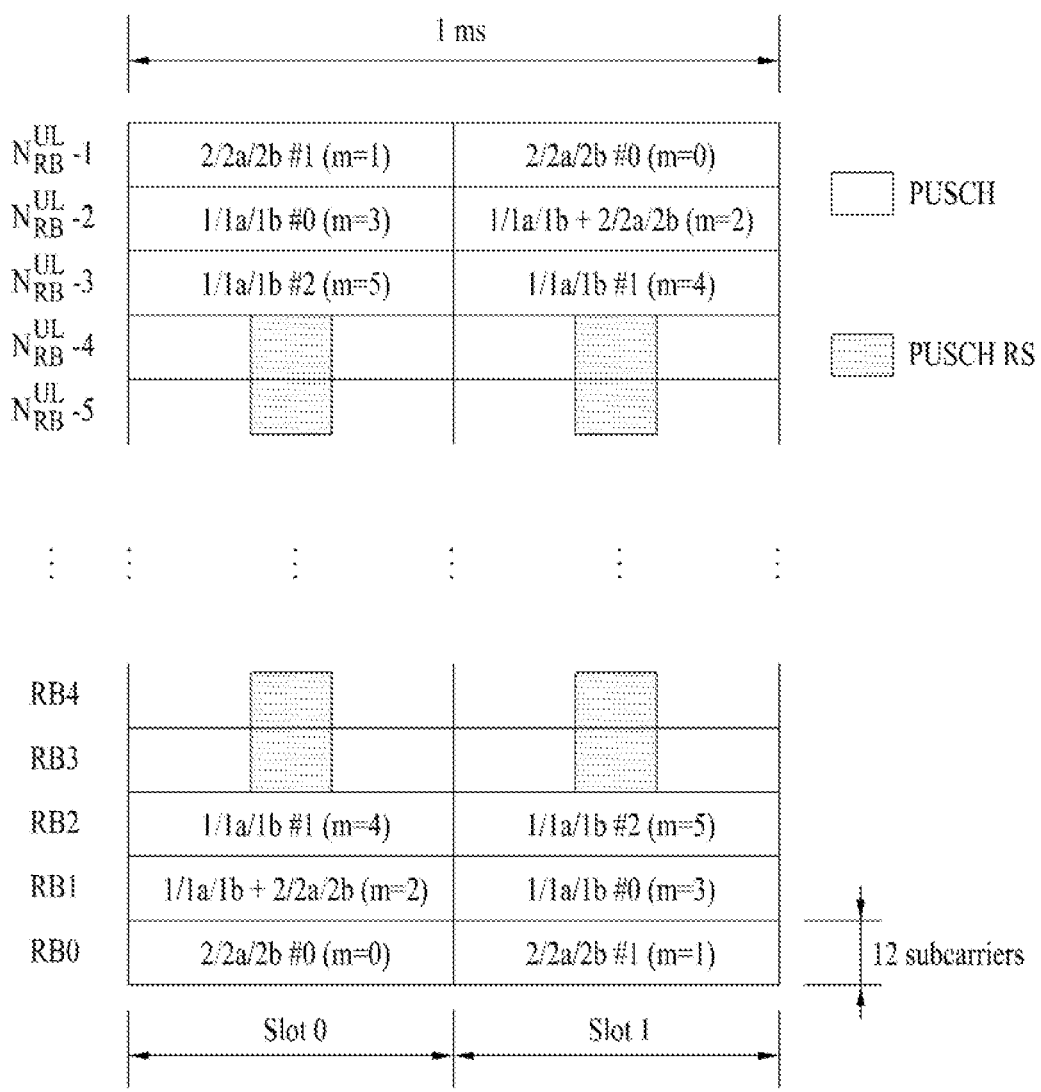
FIG. 6 illustrates an example of physically mapping a PUCCH format to a PUCCH region.

FIG. 6 illustrates an example of physically mapping a PUCCH format to a PUCCH region.

Referring to FIG. 6, PUCCH formats are mapped onto RBs in the order of PUCCH formats 2/2a/2b (CQI) (e.g. PUCCH regions m=0, 1), PUCCH formats 2/2a/2b (CQI) or PUCCH formats 1/1a/1b (SR/HARQ ACK/NACK) (e.g. PUCCH region m=2 if present), and PUCCH formats 1/1a/1b (SR/HARQ ACK/NACK) (e.g. PUCCH regions m=3, 4, 5), starting from the band-edge, and transmitted. The number $N_{RB}^{(2)}$ of PUCCH RBs, which can be used for PUCCH formats 2/2a/2b (CQI), is signaled to a UE in a cell through broadcast signaling.

Figure 7:
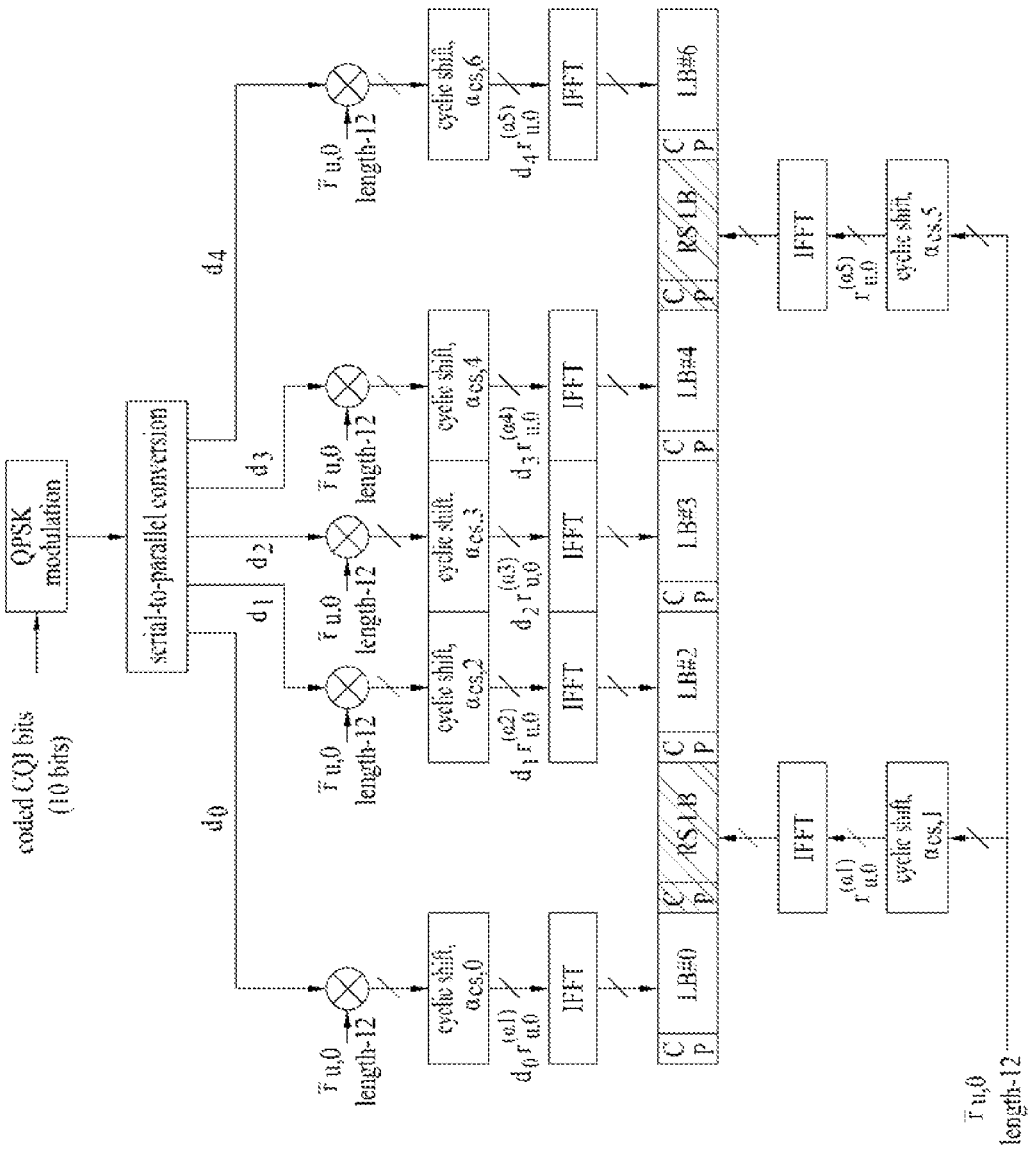
FIG. 7 illustrates a slot level structure of PUCCH formats 2/2a/2b.

FIG. 7 illustrates a slot level structure of PUCCH formats 2/2a/2b. PUCCH formats 2/2a/2b are used for CQI transmission. CSI includes CQI, PMI, RI, etc. In the case of normal CP, SC-FDMA symbols #1 and #5 in a slot are used for transmission of a Demodulation Reference Signal (DM RS). In the case of extended CP, only SC-FDMA #3 in the slot is used for DM RS transmission.

Referring to FIG. 7, at a subframe level, 10-bit CSI information is channel-coded into 20 coded bits using (20, k) Reed-Muller code punctured at a rate of 1/2 (not shown). The coded bits are scrambled (not shown) and then mapped to Quadrature Phase Shift Keying (QPSK) constellation (QPSK modulation). Scrambling can be performed using length-31 gold sequence in a similar manner that PUSCH data is scrambled. 10 QPSK modulation symbols are generated according to the QPSK modulation, and 5 QPSK modulation symbols $d_0$, $d_1$, $d_2$, $d_3$ and $d_4$ are transmitted through SC-FDMA symbols corresponding thereto in each slot. Each of the QPSK modulation symbols is used to modulate a lengh-12 base RS sequence $r_{u,0}$ prior to being subjected to Inverse Fast Fourier Transform (IFFT). Consequently, the RS sequence is cyclic-shifted in the time domain according to the QPSK modulation symbol value ($d_x * r_{u,0}^{(\alpha x)}$, x=0 to 4). The RS sequence multiplied by the QPSK modulation symbol is cyclic-shifted ($\alpha_{cs,x}$, x=1,5). When the number of cyclic shifts is N, N UEs can be multiplexed on the same CSI PUCCH RB. While a DM RS sequence is similar to a CSI sequence in the frequency domain, the DM RS sequence is not modulated by a CQI modulation symbol.

Parameters/resources for periodic CQI reports are configured semi-statically according to higher layer (e.g. Radio Resource Control (RRC)) signaling. If PUCCH resource index $n_{PUCCH}^{(2)}$, is set for CQI transmission, for example, CQI is periodically transmitted on a CQI PUCCH linked to PUCCH resource index $n_{PUCCH}^{(2)}$. PUCCH resource index $n_{PUCCH}^{(2)}$ indicates a PUCCH RB and cyclic shift $\alpha_{cs}$.

Figure 8:
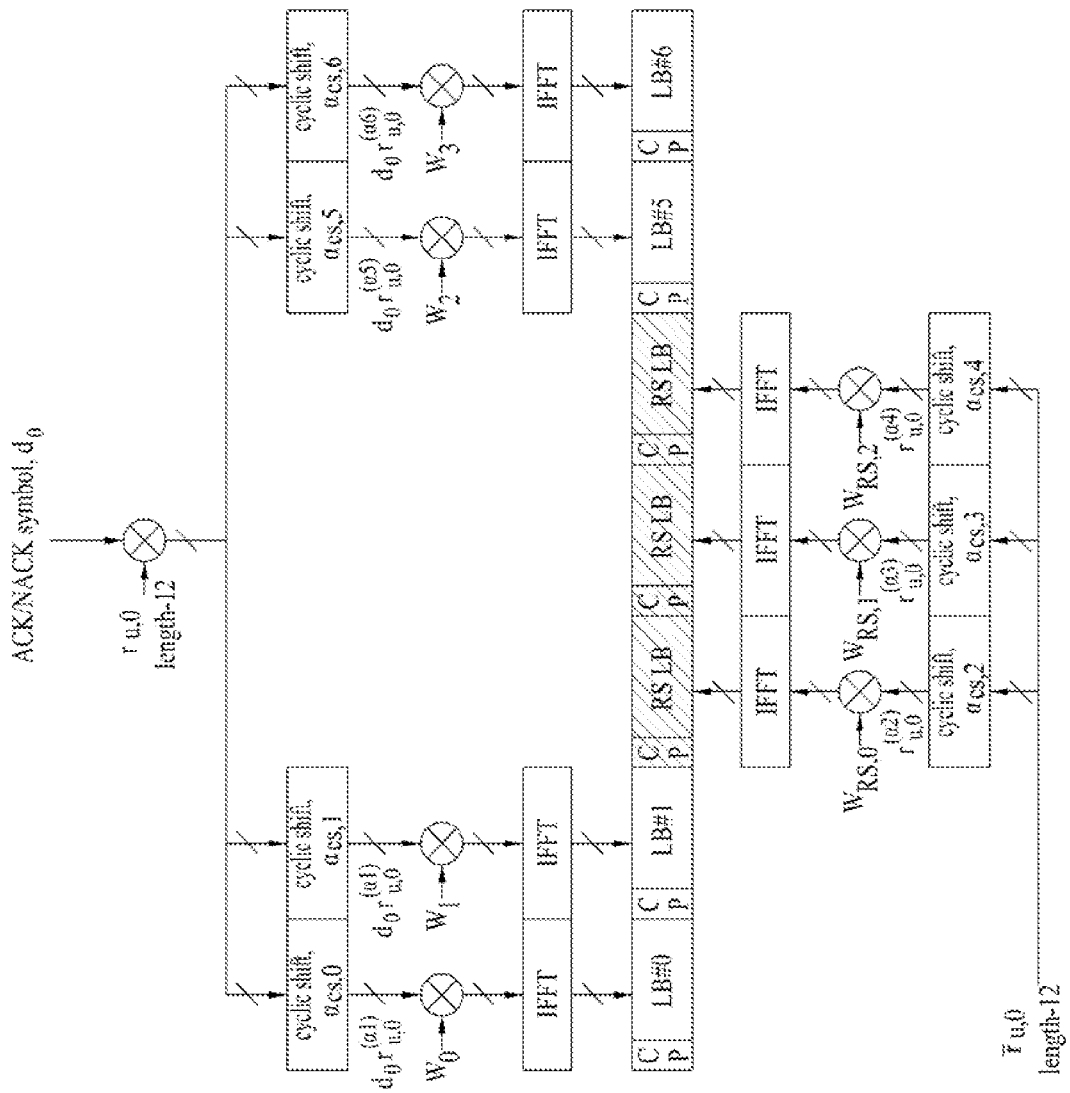
FIG. 8 illustrates a slot level structure of PUCCH formats 1a/1b.

FIG. 8 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission.

Referring to FIG. 8, 1-bit and 2-bit ACK/NACK information are modulated according to BPSK and QPSK modulation schemes respectively, to generate one ACK/NACK modulation symbol $d_0$. The ACK/NACK information corresponds to 1 in the case of positive ACK and corresponds to 0 in case of negative ACK (HACK). Table 2 shows a modulation table defined for PUCCH formats 1a and 1b in legacy LTE.

TABLE 2

| PUCCH format | b(0), ... , b($M_{bit}$ − 1) | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code $W_0$, $W_1$, $W_2$, $W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

RSs transmitted from different UEs are multiplexed using the same method as is used to multiplex UCI. The number of cyclic shifts supported by SC-FDMA symbols for PUCCH ACK/NACK RB can be configured by cell-specific higher layer signaling parameter $\Delta_{shift}^{PUCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 9:
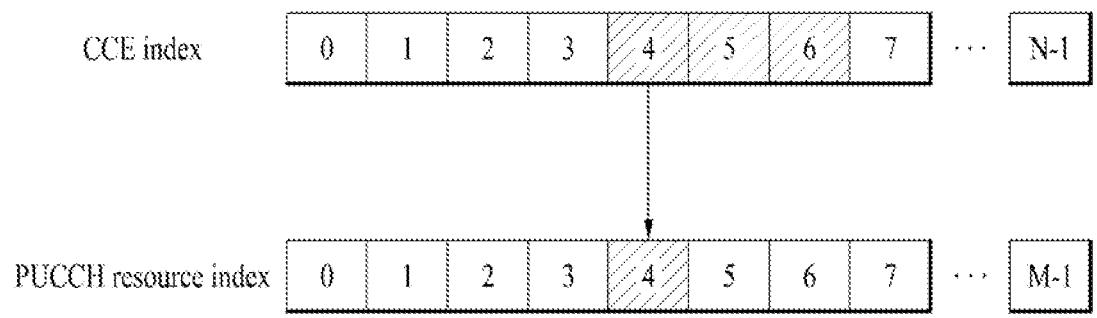
FIG. 9 illustrates an example of determining a PUCCH resource for ACK/NACK.

FIG. 9 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered. The region in which the PDCCH is transmitted in a DL subframe is configured with a plurality of Control Channel Elements (CCEs), and the PDCCH transmitted to the UE is composed of one or more CCEs. The UE transmits the ACK/NACK signal through a PUCCH resource corresponding to a specific one (e.g. first CCE) of the CCEs constituting the received PDCCH.

Referring to FIG. 9, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 9, a UE transmits an ACK/NACK signal on PUCCH #4 corresponding to CCE #4, the first CCE of the PDCCH. FIG. 9 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n^{(1)}_{PUCCH} = n_{CCE} + N^{(1)}_{PUCCH} \quad \text{[Equation 1]}$$

Here, $n^{(1)}_{PUCCH}$ represents a resource index of PUCCH format 1 for ACK/NACK/DTX transmission, $n^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

When an LTE system operates in TDD, a UE transmits one multiplexed ACK/NACK signal for a plurality of PDSCHs received through subframes at different timings. Specifically, the UE transmits one multiplexed ACK/NACK signal for a plurality of PDSCHs using an ACK/NACK channel selection scheme (channel selection scheme). The ACK/NACK channel selection scheme is also referred to as a PUCCH selection scheme. When the UE receives a plurality of DL data in the ACK/NACK channel selection scheme, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 3 shows an ACK/NACK channel selection scheme defined in LTE.

TABLE 3

| HARQ-ACK(0), HARQ-ACK(1), HARQ-ACK(2), HARQ-ACK(3) | Subframe | |
|---|---|---|
| | $n^{(1)}_{PUCCH,X}$ | b(0), b(1) |
| ACK, ACK, ACK, ACK | $n^{(1)}_{PUCCH,1}$ | 1,1 |
| ACK, ACK, ACK, NACK/DTX | $n^{(1)}_{PUCCH,1}$ | 1,0 |
| NACK/DTX, NACK/DTX, NACK, DTX | $n^{(1)}_{PUCCH,2}$ | 1,1 |
| ACK, ACK, NACK/DTX, ACK | $n^{(1)}_{PUCCH,1}$ | 1,0 |
| NACK, DTX, DTX, DTX | $n^{(1)}_{PUCCH,0}$ | 1,0 |
| ACK, ACK, NACK/DTX, NACK/DTX | $n^{(1)}_{PUCCH,1}$ | 1,0 |
| ACK, NACK/DTX, ACK, ACK | $n^{(1)}_{PUCCH,3}$ | 0,1 |
| NACK/DTX, NACK/DTX, NACK/DTX, NACK | $n^{(1)}_{PUCCH,3}$ | 1,1 |
| ACK, NACK/DTX, ACK, NACK/DTX | $n^{(1)}_{PUCCH,2}$ | 0,1 |
| ACK, NACK/DTX, NACK/DTX, ACK | $n^{(1)}_{PUCCH,0}$ | 0,1 |
| ACK, NACK/DTX, NACK/DTX, NACK/DTX | $n^{(1)}_{PUCCH,0}$ | 1,1 |
| NACK/DTX, ACK, ACK, ACK | $n^{(1)}_{PUCCH,3}$ | 0,1 |
| NACK/DTX, NACK, DTX, DTX | $n^{(1)}_{PUCCH,1}$ | 0,0 |
| NACK/DTX, ACK, ACK, NACK/DTX | $n^{(1)}_{PUCCH,2}$ | 1,0 |
| NACK/DTX, ACK, NACK/DTX, ACK | $n^{(1)}_{PUCCH,3}$ | 1,0 |
| NACK/DTX, ACK, NACK/DTX, NACK/DTX | $n^{(1)}_{PUCCH,1}$ | 0,1 |
| NACK/DTX, NACK/DTX, ACK, ACK | $n^{(1)}_{PUCCH,3}$ | 0,1 |
| NACK/DTX, NACK/DTX, ACK, NACK/DTX | $n^{(1)}_{PUCCH,2}$ | 0,0 |
| NACK/DTX, NACK/DTX, NACK/DTX, ACK | $n^{(1)}_{PUCCH,3}$ | 0,0 |
| DTX, DTX, DTX, DTX | N/A | N/A |

In Table 3, HARQ-ACK(i) indicates the HARQ ACK/NACK/DTX result of an i-th data unit (where $0 \leq i \leq 3$). DTX (Discontinuous Transmission) represents that there is no transmission of a data unit corresponding to HARQ-ACK(i) or the UE does not detect the data unit corresponding to HARQ-ACK(i). Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 3, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except in some cases (NACK/DTX, N/D).

Figure 10:
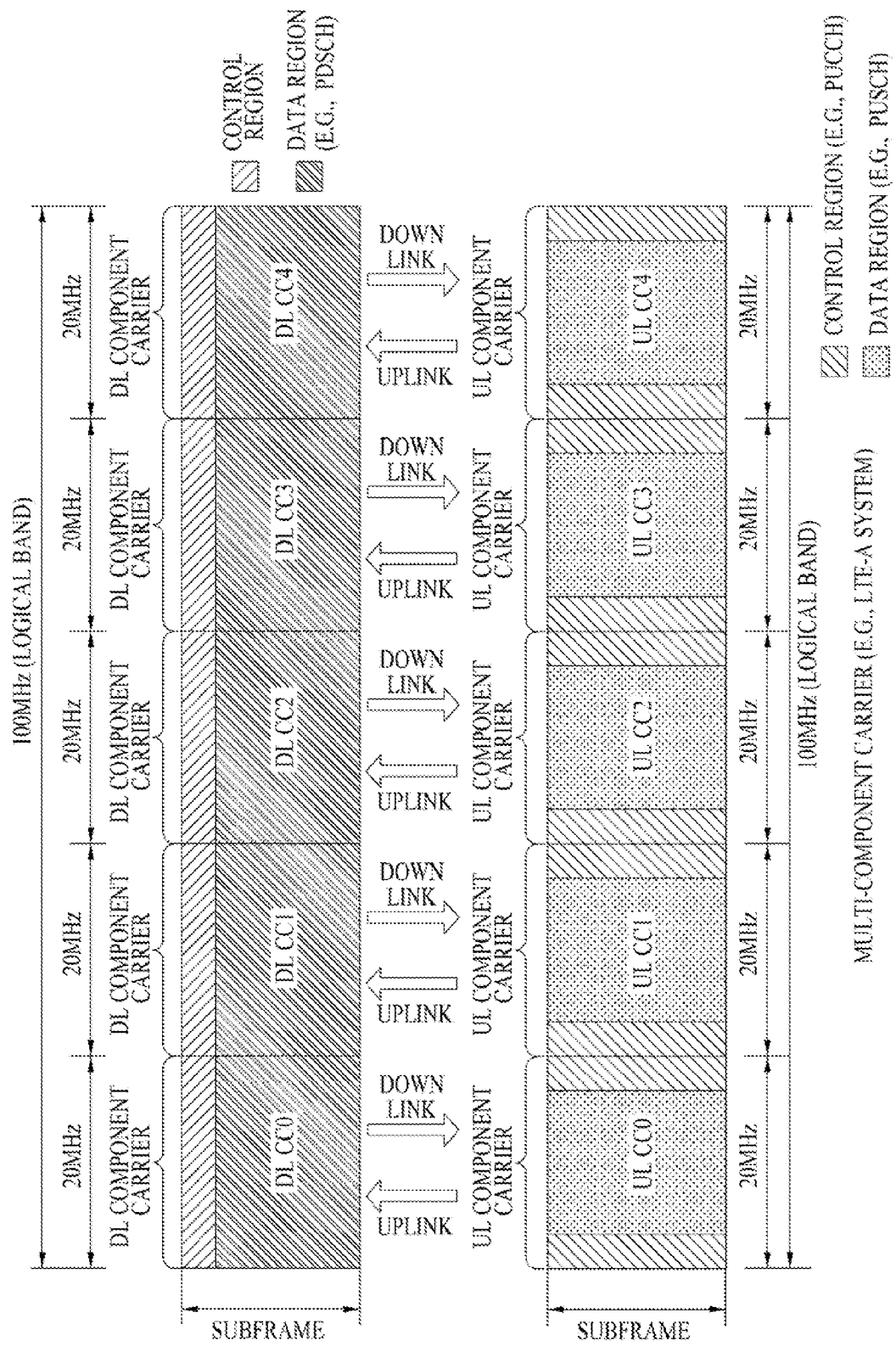
FIG. 10 exemplarily shows a carrier aggregation (CA) communication system.

FIG. 10 exemplarily shows a carrier aggregation (CA) communication system. The LTE-A system is designed to use a carrier aggregation or bandwidth aggregation technique using a plurality of UL/DL frequency blocks so as to use a wider frequency band. Each frequency block is transmitted using a component carrier (CC). The CC may be regarded as a carrier frequency (or center carrier, center frequency) for the frequency block.

Referring to FIG. 10, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

LTE-A uses the concept of a cell so as to manage radio resources. The cell is defined as a combination of DL resources and UL resources. Here, the UL resources are not an essential part. Accordingly, the cell can be configured with DL resources only, or DL resources and UL resources. When CA is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while in an RRC_connected state, only one serving cell configured with a PCell exists. Conversely, for a UE that is in an RRC_Connected state and supports CA, one or more serving cells including a PCell and a SCell are provided. For CA, a network can configure one or more SCells for a UE that supports CA in addition to a PCell initially configured during a connection establishment procedure after an initial security activation procedure.

When cross-carrier scheduling (or cross-CC scheduling) is applied, a PDCCH for DL allocation can be transmitted through DL CC#0 and a PDSCH corresponding thereto can be transmitted through DL CC#2. For cross-CC scheduling, introduction of a Carrier Indicator Field (CIF) may be considered. The presence or absence of a CIF in a PDCCH can be set semi-statically and UE-specifically (or UE-group-specifically) according to higher layer signaling (e.g. RRC signaling). The base line of PDCCH transmission is summarized as follows.

CIF disabled: PDCCH on a DL CC allocates a PDSCH resource on the same DL CC or allocates a PUSCH resource on a linked UL CC.

CIF enabled: PDCCH on a DL CC can allocate a PDSCH or a PUSCH on a specific UL/DL CC from among a plurality of aggregated DL/UL CCs using the CIF.

When a CIF is present, a BS can allocate a PDCCH monitoring DL CC set in order to reduce BD complexity of a UE. The PDCCH monitoring DL CC set includes one or more DL CCs as part of aggregated DL CCs, and the UE detects/decodes a PDCCH only on DL CCs corresponding to the DL CC set. That is, if the BS schedules PDSCH/PUSCH for the UE, the PDCCH is transmitted only through a PDCCH monitoring DL CC set. The PDCCH monitoring DL CC set can be determined UE-specifically, UE-group-specifically or cell-specifically. The term "PDCCH monitoring DL CC" can be replaced by equivalent terms "monitoring carrier", "monitoring cell", etc. In addition, the term "aggregated CC" for a UE can be replaced by terms "serving CC", "serving carrier", "serving cell", etc.

Figure 11:
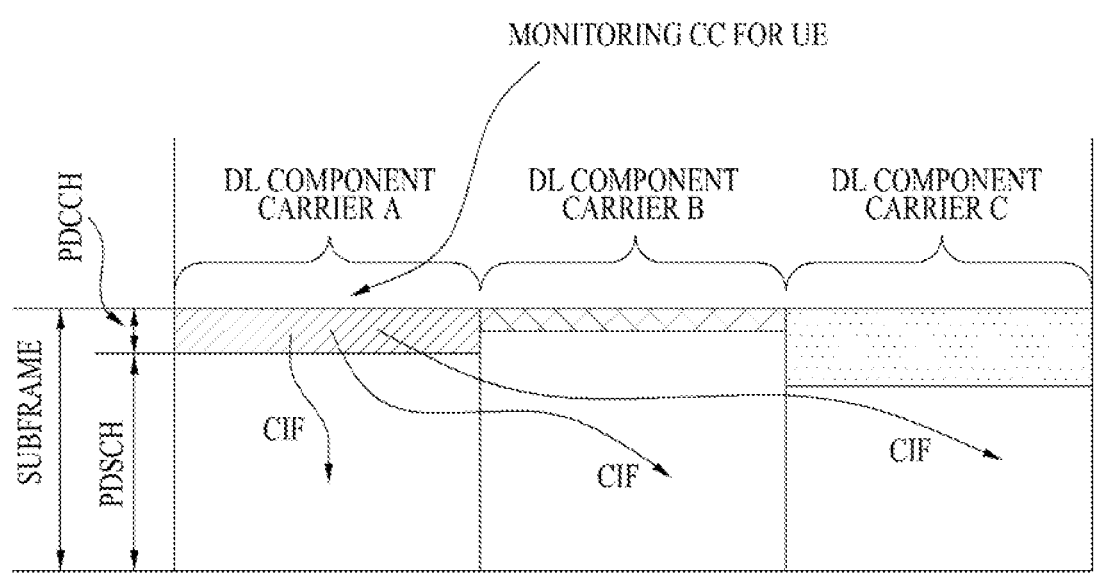
FIG. 11 exemplarily shows cross-carrier scheduling.

FIG. 11 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to PDCCH monitoring DL CCs do not deliver PDCCHs.

In contrast, an ACK/NACK multiplexing (i.e., ACK/NACK channel selection) method (refer to Table 3) applied to LTE TDD employs an implicit ACK/NACK channel selection scheme using a PUCCH resource corresponding to a PDCCH that schedules a PDSCH of a UE (i.e., linked with the smallest CCE index) so as to obtain PUCCH resources for the UE. On the other hand, the LTE-A system considers transmission of a plurality of ACK/NACK information/signals with respect to a plurality of PDSCHs, which are transmitted through a plurality of DL CCs, through a specific UL CC. For this purpose, LTE-A considers the ACK/NACK channel selection scheme that uses either implicit PUCCH resource linked to a PDCCH (i.e., DL grant PDCCH) scheduling a DL CC, or a combination of implicit PUCCH resource and explicit PUCCH resource reserved for each UE through RRC signaling. For example, the implicit PUCCH resource may include the smallest CCE index ($n_{CCE}$) constructing a DL grant PDCCH or a PUCCH resource linked to $n_{CCE}$ and ($n_{CCE}$+offset) (e.g., $n_{CCE}$+1).

On the other hand, for efficient operation and management of each PUCCH resource, the present invention may consider the ACK/NACK channel selection scheme (i.e., implicit A/N channel selection scheme) that uses one or two implicit PUCCH resources linked to a PDCCH (i.e., DL grant PDCCH) scheduling each CC with respect to all DL CCs without using explicit PUCCH resources. Assuming that all DL grant PDCCHs are scheduled/transmitted through a DL PCC (e.g., DL CC linked to UL CC (i.e., UL PCC) configured to perform ACK/NACK transmission), CCEs of all DL grant PDCCHs are given on DL PCC without overlapping thereof, such that a PUCCH resource (index) linked to a CCE index of the corresponding PDCCH is solely designated on UL PCC. Therefore, although the implicit ACK/NACK channel selection scheme is used in the self-carrier scheduling situation, no problems occur in PUCCH resource allocation.

However, when the implicit ACK/NACK channel selection scheme is used in a cross-carrier scheduling situation, some problems may occur in PUCCH resource allocation. For example, when PDCCH is scheduled/transmitted through DL CC (i.e., SCC) other than DL PCC, a CCE of each PDCCH is independently given on DL PCC and DL SCC, such that the CCE indices constructing a PDCCH may collide between DL CCs. In addition, the size of a frequency band and the number of OFDM symbols contained in a control region are independently given according to DL CCs, such that the number of CCEs available in DL PCC may be different from the number of CCEs available in DL SCC. Therefore, a CCE index constructing a PDCCH on DL SCC may not be defined in DL PCC or may be unavailable. Due to the same reason, a PUCCH resource (index) linked to a CCE index constructing a PDCCH on DL SCC may not be defined in UL PCC, or may be unavailable. In more detail, it is assumed that PUCCH index is decided by a CCE index defined in DL PCC at UL PCC, and BW of DL PCC and/or a CFI (Control Format Indicator) value of PCFICH is less than BW of DL SCC and/or a CFI value of PCFICH. In this case, a CCE index corresponding to a PDCCH that is scheduled/transmitted through DL SCC may be higher than a maximum CCE index defined in DL PCC. In this case, a PUCCH index linked to the corresponding DL SCC CCE index is not defined in UL PCC, or may be unavailable.

A method for determining implicit PUCCH resources linked to a PDCCH (i.e., SCC PDCCH) scheduled/transmitted through SCC at UL PCC according to the embodiment of the present invention will hereinafter be described in detail.

In more detail, the present invention may use Method 1 that uses a total number of CCEs defined in each subframe at DL PCC; Method 2 that uses a maximum number of CCEs defined in DL PCC; and Method 3 that uses CCE index change information (e.g., offset) allocated through signaling.

It is assumed that 2 CCs are configured for one UE in the following description for convenience. Furthermore, it is assumed that a maximum of one transport block (or codeword) can be transmitted in a subframe k of a CC when the CC is set to a non-MIMO mode and up to m (e.g. 2) transport blocks (or codewords) can be transmitted in the subframe k of the CC when the CC is set to a MIMO mode. It is possible to recognize whether the CC is set to the MIMO mode using a transmission mode set by a higher layer. In addition, it is assumed that one (non-MIMO) or m (MIMO) ACKs/NACKs are generated for a corresponding CC according to a transmission mode set for the corresponding CC irrespective of the number of actually transmitted transport blocks (or codewords).

Terms for use in the embodiments of the present invention will hereinafter be described in detail.

HARQ-ACK: HARQ-ACK indicates a reception response to DL transmission (e.g., PDSCH or SPS release PDCCH). That is, HARQ-ACK indicates ACK/NACK/DTX response (simply, ACK/NACK response). The ACK/NACK/DTX response indicates ACK, NACK, DTX or NACK/DTX. "HARQ-ACK for a specific CC" or "HARQ-ACK of a specific CC" represents an ACK/NACK response to a DL signal (e.g. PDSCH) related to the corresponding CC (e.g. scheduled to the corresponding CC). An ACK/NACK state means a combination of a plurality of HARQ-ACKs. Here, PDSCH may be replaced with a transport block (TB) or a codeword.

PUCCH resource (index): The term "PUCCH resource (index)" may also be used interchangeably with the terms "PUCCH resource" and "PUCCH resource index". The PUCCH resource index is mapped to at least one of an orthogonal cover (OC), a cyclic shift (CS) and a PRB. When an ACK/NACK channel selection scheme is applied, the PUCCH resource (index) includes a PUCCH resource (index) for PUCCH format 1b.

PUCCH resource linked to PDCCH: This term "PUCCH resource linked to PDCCH" refers to a PUCCH resource linked to a CCE constructing a PDCCH. For example, the PUCCH resource can be determined using the smallest CCE index constructing a PDCCH (e.g., See Equation 1, implicit PUCCH resources). In this specification, this term PUCCH resource linked to PDCCH is also referred to as implicit PUCCH resource.

PCC PDCCH: This term "PCC PDCCH" may indicate a PDCCH scheduled/transmitted on PCC.

SCC PDCCH: This term "SCC PDCCH" may indicate a PDCCH scheduled/transmitted on SCC.

Cross-CC scheduling: This term "Cross-CC scheduling" is used interchangeably with the term "cross-carrier scheduling". This means that a CC used for PDCCH transmission is different from a CC used for PDSCH transmission.

Non-cross-CC scheduling: This term "non-cross-CC scheduling" is used interchangeably with the term "self-carrier scheduling". This means that a CC used for PDCCH transmission is identical to a CC used for transmission of the corresponding PDSCH.

LTE-A, permits cross-carrier scheduling for a DL PCC while allowing only self-carrier scheduling for a DL SCC. In this case, a PDCCH that schedules a PDSCH on the DL PCC can be transmitted only on the DL PCC. On the other hand, a PDCCH that schedules a PDSCH on the DL SCC can be transmitted on the DL PCC (cross-carrier scheduling) or transmitted on the DL SCC (self-carrier scheduling).

Method 1) Method of Using a Total Number of CCEs Defined for each Subframe in DL PCC Method 1 relates to a method for mapping a CCE index (SCC CCE) of a DL SCC to a CCE index (PCC CCE) of a DL PCC in a non-cross carrier situation. Method 1 can be effectively used when the number of CCEs of DL SCC is larger than the number of CCEs of DL PCC. In more detail, Method 1 relates to a method for cyclically mapping a CCE index of DL SCC to a PUCCH resource index given on the basis of a CCE index defined in each subframe of DL PCC.

For example, a CCE index corresponding to a function value that has an SCC CCE index as a factor is determined in the range of a total number of CCEs defined in each subframe of DL PCC, and a PUCCH resource index can be determined on the basis of the determined result. If a function value that has a CCE index of DL SCC as a factor is mapped to a CCE of DL PCC on a one to one basis, and if the function value exceeds a total number of CCEs ($N_{PCC\text{-}CCE}$) defined in a subframe of DL PCC, the above-mentioned function value may be cyclically mapped (i.e., overlap-mapped) to a CCE of DL PCC. In this case, a PUCCH resource linked to SCC PDCCH may be determined using a CCE index of DL PCC corresponding to a CCE index of DL SCC. A total number of CCEs defined in each subframe of DL PCC may be determined according to CFI values (e.g., 1~3 OFDM symbols or 2~4 OFDM symbols) signaled per subframe.

In more detail, the function value of a specific CCE index ($n_{SCC\text{-}CCE}$) constructing SCC PDCCH is modulo-operated with $N_{PCC\text{-}CCE}$, and a CCE index ($n_{PCC\text{-}CCE}$) corresponding to a DL PCC can be decided. According to the DL SCC transmission mode, $n_{PCC\text{-}CCE}$ may be mapped to one or more PUCCH resource indexes. For example, assuming that DL SCC is established in a transmission mode supporting transmission of a maximum of one transport block (TB), $n_{PCC\text{-}CCE}$ may be mapped to the corresponding PUCCH resource index (e.g., See Equation 1). In contrast, assuming that DL SCC is established in a transmission mode supporting a maximum of two transport blocks (TBs), $n_{PCC\text{-}CCE}$ and ($n_{PCC\text{-}CCE}+\alpha$) (e.g., $\alpha=1$) may be mapped to PUCCH resource indexes, respectively (for example, See Equation 1).

Equations 2 and 3 exemplarily show methods for deciding PCC CCEs corresponding to SCC CCEs according to Method 1. Equation 2 indicates one case in which the CCE index starts from 0, and Equation 3 indicates another case in which the CCE index starts from 1.

$$n_{PCC\text{-}CCE} = \text{modulo}\ (f(n_{SCC\text{-}CCE}), N_{PCC\text{-}CCE}) \qquad \text{[Equation 2]}$$

$$n_{PCC\text{-}CCE} = \text{modulo}\ (f(n_{SCC\text{-}CCE}), N_{PCC\text{-}CCE})+1 \qquad \text{[Equation 3]}$$

In Equations 2 and 3, $n_{PCC\text{-}CCE}$ is the CCE index on DL PCC. $n_{SCC\text{-}CCE}$ is an index of a specific CCE (e.g., the smallest CCE index) from among one or more CCEs constructing SCC PDCCH. $N_{PCC\text{-}CCE}$ is a total number of CCEs defined in a subframe of DL PCC. In other words, $N_{PCC\text{-}CCE}$ is a total number of CCEs defined in a DL PCC on a subframe through which SCC PDCCH is scheduled/transmitted. modulo(x,y) is defined as the remainder obtained when 'x' is divided by 'y'.

$f(n_{SCC\text{-}CCE})$ is a function value in which $n_{SCC\text{-}CCE}$ is used as a factor. The scope or spirit of $f(n_{SCC\text{-}CCE})$ for use in the present invention is not limited thereto, and $f(n_{SCC\text{-}CCE})$ may be identical to $A*n_{SCC\text{-}CCE}+B$. A and B may be independently given, and may be a constant or a function. A and/or B may be signaled through higher layer signaling (RRC signaling), or may have a predefined value.

In Equations 2 and 3, assuming that $f(n_{SCC\text{-}CCE})=A*n_{SCC\text{-}CCE}+B$ [where A=1, B=0] is given, PCC CCE corresponding to SCC CCE is represented by the following equations. Equation 4 denotes that the CCE index starts from 0, and Equation 5 denotes that the CCE index starts from 1.

$$n_{PCC\text{-}CCE} = \text{modulo}\ (n_{SCC\text{-}CCE}, N_{PCC\text{-}CCE}) \qquad \text{[Equation 4]}$$

$$n_{PCC\text{-}CCE} = \text{modulo}\ (n_{SCC\text{-}CCE}, N_{PCC\text{-}CCE})+1 \qquad \text{[Equation 5]}$$

Figure 12:
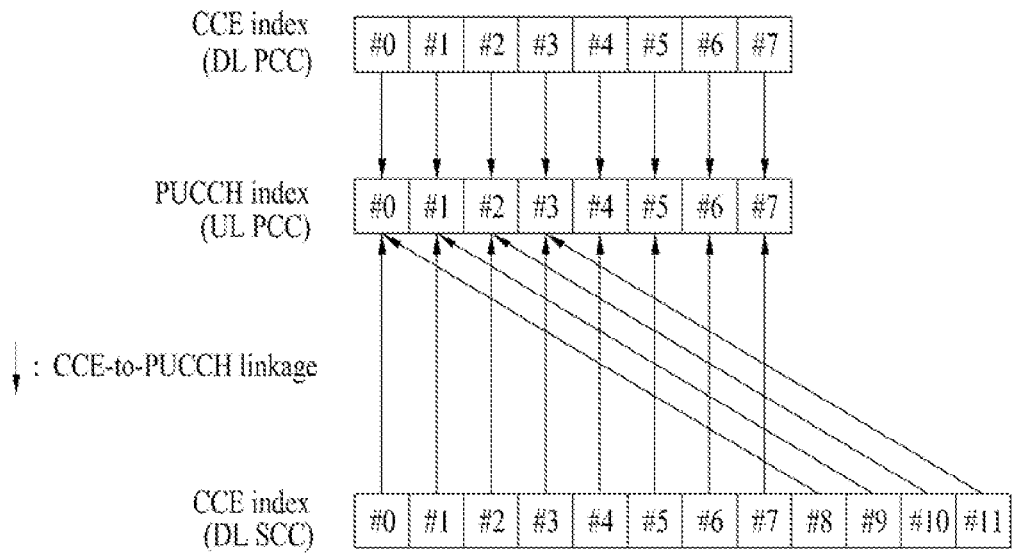
FIG. 12 exemplarily shows ACK/NACK resource allocation according to one embodiment of the present invention.

FIG. 12 exemplarily shows a method for allocating implicit PUCCH resources corresponding to SCC PDCCH according to one embodiment of the present invention. The example of FIG. 12 is based on Method of Equation 4.

Referring to FIG. 12, a total of 8 CCEs are present in DL PCC at a subframe for PDCCH transmission, and a total of 12 CCEs are present in DL SCC at the subframe for PDCCH transmission. In FIG. 12, it is assumed that $N^{(1)}_{PUCCH}$ is set to 1 as shown in Equation 1. Therefore, a CCE index of DL PCC is mapped to a PUCCH index ($n^{(1)}_{PUCCH}$) having the same value. On the other hand, the CCE index of DL SCC is cyclically mapped to a PUCCH resource index on the basis of the CCE index of DL PCC. In more detail, CCE indexes #0 to #7 of DL SCC are sequentially mapped to PUCCH indexes #0 to #7 as shown in Equation 1. In contrast, CCE indexes #8 to #11 of DL SCC are cyclically mapped to PUCCH indexes #0 to #3.

Therefore, if PDCCH (CCE indexes #9 to #11) and a PDSCH corresponding to the PDCCH are detected in DL SCC, the UE can transmit ACK/NACK information for the PDSCH using resources corresponding to the PUCCH resource index #1. If the ACK/NACK channel selection scheme is applied under the same condition, the UE selects only one PUCCH resource index from among multiple PUCCH resource indexes including a PUCCH resource index #1, and bit values corresponding to multiple ACK/NACK signals can be transmitted using resources corresponding to the selected PUCCH resource index.

In another method, assuming that a total number of CCEs defined in each subframe are defined as $N_{SCC-CCE}$ at DL SCC, PUCCH resources can be determined using Equations 6 and 7. Equations 6 and 7 correspond to the case in which "$f(n_{SCC-CCE})=A*n_{SCC-CCE}+B$ [where A=1, B=abs($N_{SCC-CCE}-N_{PCC-CCE}$)]". Equation 6 denotes that the CCE index starts from 0, and Equation 7 denotes that the CCE index starts from 1.

$$N_{PCC-CCE} = \text{modulo}(n_{SCC-CCE} + \text{abs}(N_{SCC-CCE} - N_{PCC-CCE}), N_{PCC-CCE}) \quad \text{[Equation 6]}$$

$$N_{PCC-CCE} = \text{modulo}(n_{SCC-CCE} + \text{abs}(N_{SCC-CCE} - N_{PCC-CCE}), N_{PCC-CCE}) + 1 \quad \text{[Equation 7]}$$

In Equations 6 and 7, $n_{PCC-CCE}$, $n_{SCC-CCE}$, $N_{PCC-CCE}$, and modulo(x,y) have already been defined as described above. $N_{SCC-CCE}$ is a total number of CCEs defined in a subframe of DL SCC. In other words, $N_{SCC-CCE}$ is a total number of CCEs defined in DL SCC on a subframe through which SCC PDCCH is scheduled/transmitted. Abs(x) is an absolute value of x.

Figure 13:
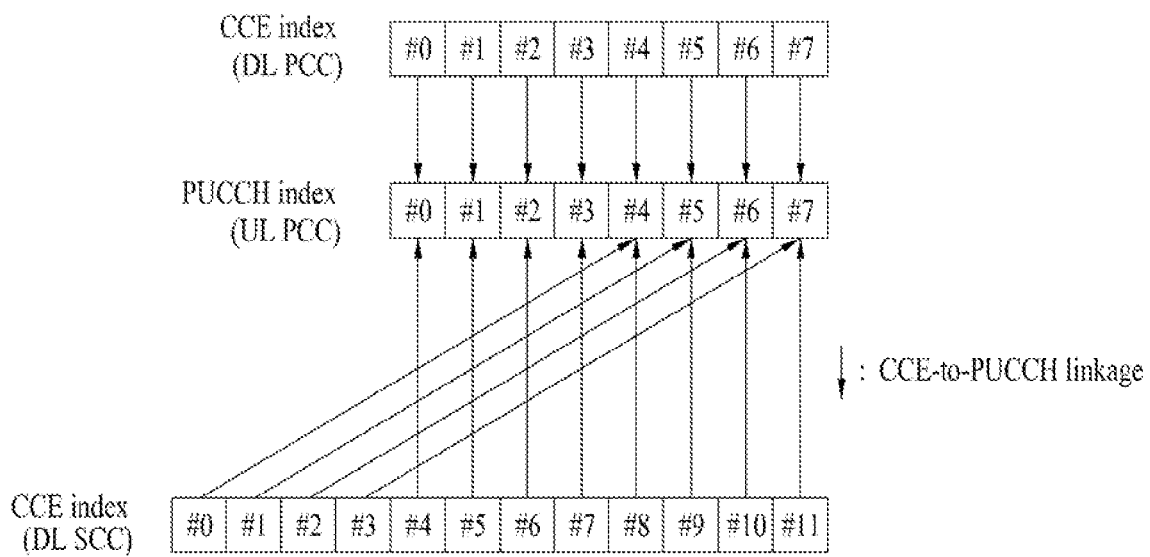
FIG. 13 exemplarily shows ACK/NACK resource allocation according to another embodiment of the present invention.

FIG. 13 exemplarily shows a method for allocating implicit PUCCH resources corresponding to SCC PDCCH according to one embodiment of the present invention. The example of FIG. 13 is based on Method of Equation 6.

Referring to FIG. 13, a total of 8 CCEs are present in DL PCC at a subframe for PDCCH transmission, and a total of 12 CCEs are present in DL SCC at the subframe for PDCCH transmission. In FIG. 13, it is assumed that $N^{(1)}_{PUCCH}$ is set to 1 as shown in Equation 1. Therefore, a CCE index of DL PCC is mapped to a PUCCH index ($n^{(1)}_{PUCCH}$) having the same value. On the other hand, the CCE index of DL SCC is cyclically mapped to a PUCCH resource index on the basis of the CCE index of DL PCC. Compared to FIG. 12, a difference value between the number of CCEs of DL PCC and the number of CCEs of DL SCC is used as an offset value when CCE-to-PUCCH resource index mapping of DL SCC is performed. In more detail, CCE indexes #0 to #3 of DL SCC are sequentially mapped to PUCCH indexes #4 to #7. In contrast, CCE indexes #4 to #11 of DL SCC are cyclically mapped to PUCCH indexes #0 to #7.

Therefore, if PDCCH (CCE indexes #9 to #11) and a PDSCH corresponding to the PDCCH are detected in DL SCC, the UE can transmit ACK/NACK information for the PDSCH using resources corresponding to the PUCCH resource index #5. If the ACK/NACK channel selection scheme is applied under the same condition, the UE selects only one PUCCH resource index from among multiple PUCCH resource indexes including a PUCCH resource index #5, and bit values corresponding to multiple ACK/NACK signals can be transmitted using resources corresponding to the selected PUCCH resource index.

The above-mentioned method and equations have mainly disclosed a method for determining a CCE index of DL PCC on the basis of a CCE index of DL SCC, and then determining a PUCCH resource index on the basis of the determined CCE index. However, the above-mentioned steps are disclosed only for illustrative purposes, and it should be noted that methods and equations indicating the same effects as in Equations 2 to 7 and FIGS. 12 and FIGS. 13 belong to the scope or spirit of the present invention. For example, Equations 2 to 7 may be modified in a manner that the CCE index is directly mapped to a PUCCH resource index. In more detail, a CCE index of DL PCC shown in Equations 2 to 7 is replaced with a PUCCH resource index, and may be combined with contents of Equation 1. In another example, as can be seen from Equations 2 to 7, $n_{PCC-CCE}$ may be replaced with $n_{SCC-CCE(new)}$. In another example, the CCE index shown in Equations 2 to 7 may be replaced with a PUCCH resource index linked to the corresponding CCE index. In this case, a total number of CCEs of DL PCC in a specific subframe may be replaced with a total number of implicit PUCCH resources (indexes) in the remaining region other than an SRS transmission region or a PUCCH hopping region.

The BS and the UE can support a plurality of methods/equations from among the above-mentioned methods/equations. In this case, the actually applied methods/equations can be cell-specifically or UE-specifically established. For example, information indicating whether Method of FIG. 12 or Method of FIG. 13 is used can be adaptively established by cell-specific signaling or UE-specific signaling.

Method 2) Method of Using a Maximum Number of CCEs Defined in DL PCC

Method 2 relates to a method for mapping a CCE index of a DL SCC to a CCE index of a DL PCC in a non-cross carrier situation. Method 2 can be effectively used when the number of CCEs of DL SCC is larger than the number of CCEs of DL PCC. In more detail, Method 2 relates to a method for cyclically mapping a CCE index of DL SCC to a given PUCCH resource index on the basis of a total number of CCE indexes defined in DL PCC.

For example, a CCE index corresponding to a function value that has an SCC CCE index as a factor is determined in the range of a total number of CCEs defined in DL PCC, and a PUCCH resource index can be determined on the basis of the determined result. If a function value that has a CCE index of DL SCC as a factor is mapped to a CCE of DL PCC on a one to one basis, and if the function value exceeds a total number of CCEs ($N_{MAX-CCE}$) defined in DL PCC, the above-mentioned function value may be cyclically mapped (i.e., overlap-mapped) to a CCE of DL PCC. In this case, a PUCCH resource linked to SCC PDCCH may be determined using a CCE index of DL PCC corresponding to a CCE index of DL SCC. A maximum number of CCEs defined in DL PCC may be determined according to CFI values (e.g., 3 or 4 OFDM symbols) defined in DL PCC.

In more detail, the function value of a specific CCE index ($n_{SCC-CCE}$) constructing SCC PDCCH is modulo-operated with $N_{MAX-CCE}$, and a CCE index ($n_{PCC-CCE}$) corresponding to a DL PCC can be decided. According to the DL SCC transmission mode, $n_{PCC-CCE}$ may be mapped to one or more PUCCH resource indexes. For example, assuming that DL SCC is established in a transmission mode supporting transmission of a maximum of one transport block (TB), $n_{PCC-CCE}$ may be mapped to the corresponding PUCCH resource index (e.g., See Equation 1). In contrast, assuming that DL SCC is established in a transmission mode supporting a maximum of two transport blocks (TBs), $n_{PCC-CCE}$ and ($n_{PCC-CCE}+\alpha$) (e.g., $\alpha=1$) may be mapped to PUCCH resource indexes, respectively (for example, See Equation 1).

Equations 8 to 13 exemplarily show methods for deciding PCC CCEs corresponding to SCC CCEs according to Method 2. Equations 8 to 13 are identical to Equations 2 to 7 each other excepting the case in which $N_{PCC-CCE}$ is replaced with $N_{MAX-CCE}$. Equations 8, 10 and 12 indicate one case in which the CCE index starts from 0, and Equations 9, 11 and 13 indicate another case in which the CCE index starts from 0.

$$n_{PCC-CCE}=\text{modulo}(f(n_{SCC-CCE}), N_{MAX-CCE}) \quad \text{[Equation 8]}$$

$$n_{PCC-CCE}=\text{modulo}(f(n_{SCC-CCE}), N_{MAX-CCE})+1 \quad \text{[Equation 9]}$$

$$n_{PCC-CCE}=\text{modulo}(n_{SCC-CCE}, N_{MAX-CCE}) \quad \text{[Equation 10]}$$

$$n_{PCC-CCE}=\text{modulo}(n_{SCC-CCE}, N_{MAX-CCE})+1 \quad \text{[Equation 11]}$$

$$n_{PCC-CCE}=\text{modulo}(n_{SCC-CCE}+\text{abs}(N_{SCC-CCE}-N_{MAX-CCE}), N_{MAX-CCE}) \quad \text{[Equation 12]}$$

$$n_{PCC-CCE}=\text{modulo}(n_{SCC-CCE}+\text{abs}(N_{SCC-CCE}-N_{MAX-CCE}), N_{MAX-CCE})+1 \quad \text{[Equation 13]}$$

In the above equations, $n_{PCC-CCE}$, $n_{SCC-CCE}$, $N_{SCC-CCE}$, modulo(x,y), and abs(x) are identical to those of Equations 2 to 7. $N_{MAX-CCE}$ is a total number of CCEs defined in DL SCC.

The above-mentioned method and equations have mainly disclosed a method for determining a CCE index of DL PCC on the basis of a CCE index of DL SCC, and then determining a PUCCH resource index on the basis of the determined CCE index. However, the above-mentioned steps are disclosed only for illustrative purposes, and it should be noted that methods and equations indicating the same effects as in Equations 8 to 13 belong to the scope or spirit of the present invention. For example, Equations 8 to 13 may be modified in a manner that the CCE index is directly mapped to a PUCCH resource index. In more detail, a CCE index of DL PCC shown in Equations 8 to 13 is replaced with a PUCCH resource index, and may be combined with contents of Equation 1. In another example, as can be seen from Equations 8 to 13, $n_{PCC-CCE}$ may be replaced with $n_{SCC-CCE(new)}$. In another example, the CCE index shown in Equations 8 to 13 may be replaced with a PUCCH resource index linked to the corresponding CCE index. In this case, a maximum number of CCEs of DL PCC in a specific subframe may be replaced with a maximum number of implicit PUCCH resources (indexes) in the remaining region other than an SRS transmission region or a PUCCH hopping region.

The BS and the UE can support a plurality of methods/equations from among the above-mentioned methods/equations. In this case, the actually applied methods/equations can be cell-specifically or UE-specifically established.

Method 3) Method for Changing Allocated CCE Index

Method 3 proposes a method for changing an index of SCC CCE allocated from the viewpoint of PUCCH resource allocation so as to prevent collision between PCC CCE and SCC CCE. Method 3 can prevent collision of PUCCH resources by adaptively adjusting the allocated SCC CCE index. In more detail, according to Method 3, the BS informs the UE of CCE index change information, and the UE can change a specific CCE index from among one or more CCEs constructing SCC PDCCH using the above-mentioned CCE index change information. In accordance with the implementation example, the changed CCE index may be processed as a new SCC CCE index, and may also be processed as a PCC CCE index corresponding to an original SCC CCE index. In more detail, each of the UE and the BS may add $O_{SCC-CCE}$ to the CCE index ($n_{SCC-CCE}$) corresponding to SCC PDCCH so as to calculate a CCE index ($n_{PCC-CCE}$). In this case, a PUCCH resource linked to SCC PDCCH may correspond to a PUCCH resource index linked to the CCE index ($n_{PCC-CCE}$). In this case, $O_{SCC-CCE}$ may indicate an integer including zero (0), and may be given through higher layer signaling (e.g., RRC signaling).

Equation 14 shows an example of CCE index modification according to Method 3.

$$n_{PCC-CCE}=n_{SCC-CCE}+O_{SCC-CCE} \quad \text{[Equation 14]}$$

In case of Method 1, Equation 14 can be modified as follows. Equation 15 indicates one case in which the CCE index starts from 0, and Equation 16 indicates another case in which the CCE index starts from 0.

$$n_{PCC-CCE}=\text{modulo}(n_{SCC-CCE}+O_{SCC-CCE}, N_{ECC-CCE}) \quad \text{[Equation 15]}$$

$$n_{PCC-CCE}=\text{modulo}(n_{SCC-CCE}+O_{SCC-CCE}, N_{ECC-CCE})+1 \quad \text{[Equation 16]}$$

In case of Method 2, Equation 14 can be modified as follows. Equation 17 indicates one case in which the CCE index starts from 0, and Equation 18 indicates another case in which the CCE index starts from 0.

$$n_{PCC-CCE}=\text{modulo}(n_{SCC-CCE}+O_{SCC-CCE}, N_{ECC-CCE})+1 \quad \text{[Equation 17]}$$

$$n_{PCC-CCE}=\text{modulo}(n_{SCC-CCE}+O_{SCC-CCE}, N_{ECC-CCE})+1 \quad \text{[Equation 18]}$$

In the above equations, $n_{PCC-CCE}$, $n_{SCC-CCE}$, $N_{MAX-CCE}$, and modulo(x,y) are identical to those of the previous equations. $O_{SCC-CCE}$ is an integer including zero (0) and indicates a CCE index offset value.

The above-mentioned method and equations have mainly disclosed a method for determining a CCE index of DL PCC on the basis of a CCE index of DL SCC, and then determining a PUCCH resource index on the basis of the determined CCE index. However, the above-mentioned steps are disclosed only for illustrative purposes, and it should be noted that methods and equations indicating the same effects as in Equations 14 to 18 belong to the scope or spirit of the present invention. For example, Equations 14 to 18 may be modified in a manner that the CCE index is directly mapped to a PUCCH resource index. In more detail, a CCE index of DL PCC shown in Equations 14 to 18 is replaced with a PUCCH resource index, and may be combined with contents of Equation 1. In another example, as can be seen from Equations 14 to 18, $n_{PCC-CCE}$ may be replaced with $n_{SCC-CCE(new)}$. In another example, the CCE index shown in Equations 14 to 18 may be replaced with a PUCCH resource index linked to the corresponding CCE index. In this case, a maximum number ($N_{PCC-CCE}$) of CCEs of DL PCC in a specific subframe may be replaced with a maximum number of implicit PUCCH resources (indexes) in the remaining region other than an SRS transmission region or a PUCCH hopping region. In addition, a maximum number ($N_{MAX-CCE}$) of CCEs of DL PCC in a specific subframe may be replaced with a maximum number of implicit PUCCH resources (indexes) in the remaining region other than the SRS transmission region or the PUCCH hopping region.

Although Method 1, Method 2 and Method 3 have been disclosed independently from one another for convenience of description, they can be combined with one another as necessary. For example, a plurality of methods/equations from among the above-mentioned methods/equations can be supported. In this case, the actually applied methods/equations can be cell-specifically or UE-specifically established. For example, the same methods/equations can be applied to all UEs contained in a cell through cell-specific configuration signaling, or an independent method/equation can be applied to each UE through UE-specific configuration signaling.

Figure 14:
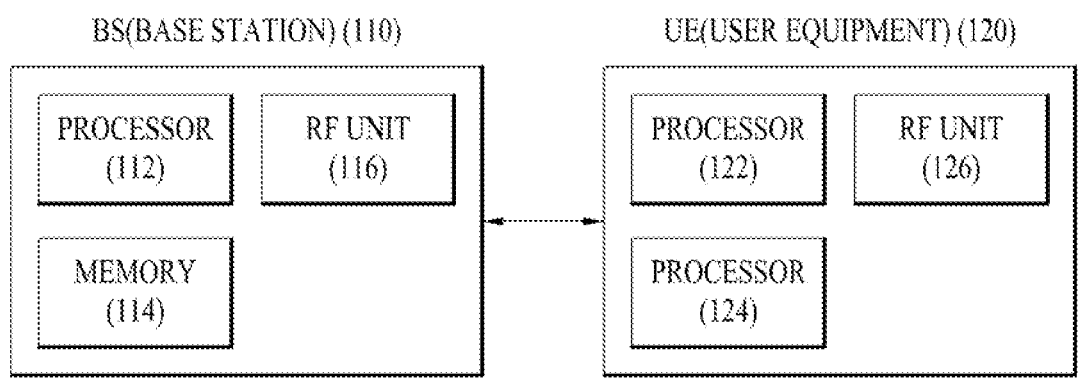
FIG. 14 is a block diagram illustrating a Base Station (BS) and a user equipment (UE) applicable to embodiments of the present invention.

FIG. 14 is a block diagram illustrating a Base Station (BS) and a user equipment (UE) applicable to embodiments of the present invention. If a relay is contained in a wireless communication system, communication in a backhaul link is achieved between a BS and a relay, and communication in an access link is achieved between a relay and a UE. Therefore, a BS or UE shown in FIG. 12 may be replaced with a relay as necessary.

Referring to FIG. 14, the wireless communication system includes a base station (BS) 110 (also denoted by 'BS') and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the BS may be performed by an upper node of the BS as the case may be. In other words, it will be apparent that various operations performed for communication with the UE in the network which includes a plurality of network nodes along with the BS can be performed by the BS or network nodes other than the BS. The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Exemplary embodiments of the present invention can be applied to wireless communication systems such as a UE, a relay, and a base station (BS).

The invention claimed is:

1. A method of transmitting uplink control information at a communication apparatus in which a plurality of cells of a single base station, including a primary cell (PCell) and a secondary cell (SCell), are configured in a wireless communication system, the method comprising:

receiving, via the SCell, a Physical Downlink Control Channel (PDCCH) signal and a Physical Downlink Shared Channel (PDSCH) signal corresponding to the PDCCH signal;

generating reception response information of the PDSCH signal; and transmitting the reception response information via the PCell using a PCell Physical Uplink Control Channel (PUCCH) resource, wherein the PCell PUCCH resource is linked to one specific SCell Control Channel Element (CCE) from among one or more SCell CCEs constructing the PDCCH, wherein the PCell PUCCH resource is determined using an index value shown in the following equation:

$$\text{Modulo } (f(n_{SCC-CCE}), M) \qquad \text{[Equation]}$$

where $n_{SCC-CCE}$ is an index of the specific SCell CCE, M is a value related to a number of PCell CCEs, f(x) is a function in which x is used as a factor, and modulo(x,y) is a remainder obtained when 'x' is divided by 'y'.

2. The method according to claim 1, wherein:
$f(n_{SCC\text{-}CCE})$ is defined as $A*n_{SCC\text{-}CCE}+B$,
where A is a constant or a function, and B is a constant or a function.

3. The method according to claim 2, wherein:
A is set to 1 (A=1), and B is set to 0 (B=0).

4. The method according to claim 2, wherein:
B includes $abs(N_{SCC\text{-}CCE}-M)$,
where abs(x) is an absolute value of the value (x), and $N_{SCC\text{-}CCE}$ is the number of the one or more SCell CCEs in a subframe in which the PDCCH is received.

5. The method according to claim 1, wherein:
$f(n_{SCC\text{-}CCE})$ is defined as $n_{SCC\text{-}CCE}+O_{SCC\text{-}CCE}$,
where $O_{SCC\text{-}CCE}$ is a CCE index offset.

6. The method according to claim 1, wherein:
M is the number of the PCell CCEs available in a subframe in which the PDCCH is received, or indicates a maximum number of CCEs defined in the PCell.

7. A communication apparatus in which a plurality of cells of a single base station, including a primary cell (PCell) and a secondary cell (SCell), is configured, the communication apparatus comprising:
a Radio Frequency (RF) unit; and
a processor operatively connected to the RF unit and configured to:
receive, via the SCell, a Physical Downlink Control Channel (PDCCH) signal and a Physical Downlink Shared Channel (PDSCH) signal corresponding to the PDCCH signal,
generate reception response information of the PDSCH signal, and
transmit the reception response information via the PCell using a PCell Physical Uplink Control Channel (PUCCH) resource,
wherein the PCell PUCCH resource is linked to one specific SCell Control Channel Element (CCE) from among one or more SCell CCEs constructing the PDCCH,
wherein the PCell PUCCH resource is determined using an index value shown in the following equation:

$$\text{Modulo }(f(n_{SCC\text{-}CCE}), M) \quad \text{[Equation]}$$

where $n_{SCC\text{-}CCE}$ is an index of the specific SCell CCE, M is a value related to a number of PCell CCEs, f(x) is a function in which x is used as a factor, and modulo(x,y) is a remainder obtained when 'x' is divided by 'y'.

8. The communication apparatus according to claim 7, wherein:
$f(n_{SCC\text{-}CCE})$ is defined as $A*n_{SCC\text{-}CCE}+B$,
where A is a constant or a function, and B is a constant or a function.

9. The communication apparatus according to claim 8, wherein:
A is set to 1 (A=1), and B is set to 0 (B=0).

10. The communication apparatus according to claim 8, wherein:
B includes $abs(N_{SCC\text{-}CCE}-M)$,
where abs(x) is an absolute value of the value (x), and $N_{SCC\text{-}CCE}$ is the number of the one or more SCell CCEs in a subframe in which the PDCCH is received.

11. The communication apparatus according to claim 7, wherein:
$f(n_{SCC\text{-}CCE})$ is defined as $n_{SCC\text{-}CCE}+O_{SCC\text{-}CCE}$,
where $O_{SCC\text{-}CCE}$ is a CCE index offset.

12. The communication apparatus according to claim 7, wherein:
M is the number of the PCell CCEs available in a subframe in which the PDCCH is received, or indicates a maximum number of CCEs defined in the PCell.

* * * * *